US012625363B2

(12) United States Patent
Craen et al.

(10) Patent No.: US 12,625,363 B2
(45) Date of Patent: May 12, 2026

(54) THERMAL EXPANSION COMPENSATION IN TUNABLE LENSES

(71) Applicant: poLight ASA, Tønsberg (NO)

(72) Inventors: Pierre Craen, Embourg (BE); Janne Tapani Kilpinen, Akaa (FI)

(73) Assignee: poLight ASA, Tonsberg (NO)

( * ) Notice: Subject to any disclaimer, the term of this patent is extended or adjusted under 35 U.S.C. 154(b) by 198 days.

(21) Appl. No.: 18/550,095

(22) PCT Filed: Mar. 29, 2022

(86) PCT No.: PCT/EP2022/058278
§ 371 (c)(1),
(2) Date: Sep. 11, 2023

(87) PCT Pub. No.: WO2022/207643
PCT Pub. Date: Oct. 6, 2022

(65) Prior Publication Data
US 2024/0184100 A1 Jun. 6, 2024

(30) Foreign Application Priority Data
Mar. 29, 2021 (EP) ...................................... 21165466

(51) Int. Cl.
*G02B 7/04* (2021.01)
*G02B 26/08* (2006.01)

(52) U.S. Cl.
CPC ................................ *G02B 26/0875* (2013.01)

(58) Field of Classification Search
CPC .................................... G02B 7/04; G02B 1/04
See application file for complete search history.

(56) References Cited

U.S. PATENT DOCUMENTS

| | | | |
|---|---|---|---|
| 2011/0096411 A1* | 4/2011 | Henriksen | G03B 3/10 |
| | | | 359/694 |
| 2017/0160442 A1 | 6/2017 | Phair et al. | |
| 2019/0018169 A1 | 1/2019 | Aschwanden | |

FOREIGN PATENT DOCUMENTS

| | | | |
|---|---|---|---|
| EP | 3754733 A1 | 12/2020 | |
| WO | WO 2015/063233 A2 | 5/2015 | |

OTHER PUBLICATIONS

International Search Report for PCT/EP2022/058278 dated Aug. 2, 2022.

* cited by examiner

*Primary Examiner* — Joseph P Martinez
(74) *Attorney, Agent, or Firm* — Knobbe Martens Olson & Bear, LLP

(57) ABSTRACT

The present invention relates to a method and to means for compensating thermal expansion in a tuneable lens. In particular, the present invention a tuneable lens comprising means for compensating thermal expansion and an apparatus, such as a camera module comprising a tunable lens comprising means for compensating thermal expansion.

13 Claims, 5 Drawing Sheets

THERMAL EXPANSION COMPENSATION IN TUNABLE LENSES

CROSS REFERENCE TO RELATED APPLICATIONS

This application is a U.S. National Phase Application of PCT International Application Number PCT/EP2022/058278, filed on Mar. 29, 2022, designating the United States of America and published in the English language, which is an International Application of and claims the benefit of priority to European Patent Application No. 21165466.0, filed on Mar. 29, 2021. The disclosures of the above-referenced applications are hereby expressly incorporated by reference in their entireties.

FIELD OF THE INVENTION

The present invention relates to a method and to means for compensating thermal expansion in a tuneable lens. In particular, the present invention relates to a tuneable lens comprising means for compensating thermal expansion and an apparatus, such as a camera module, comprising a tunable lens comprising means for compensating thermal expansion.

BACKGROUND OF THE INVENTION

Tunable lens performances are influenced by thermal induced effects.

For example, focus drift in optical system due to temperature variation is well known and it restricts the specific temperature range in which a device can be optimally used.

In that, there is a need for solutions compensating the effects of temperature drift.

In general, due to different coefficient of thermal expansion (CTE) of the materials used in the different elements of the tunable lens structure, deformation of the optical portion of the tunable lens may occur.

For example, the presence of support or pressing structure having a higher CTE of the below membrane may cause substantial displacement of the Z component of the field when temperature changes between 25° C. and 60° C.

Furthermore, tunable lens employing polymer based lens body may be further influenced by thermal induced expansion. Due to the different CTE of the polymer lens body, the distance between membranes or between the membrane and the substrate underneath may increase when temperature increases. As a consequence, the optical path may be changed and the actuator interface position may differ, influencing the optical performance of the tuneable lens.

Moreover, index of refraction of the polymer based lens body may also change over temperature, introducing further optical performances shift.

In that, several parameters may contribute to thermal induced variation and there is a need for systems and methods for compensating effects due to optical variation induced by thermal expansion within tuneable lenses.

Hence, a tunable lens being able to compensate for thermal defocus would be advantageous.

OBJECT OF THE INVENTION

An object of the present invention is to provide a tunable lens being able to compensate for thermal defocus.

An object of the present invention may also be seen as to provide an alternative to the prior art.

In particular, it may be seen as an object of the present invention to provide a tunable lens being able to compensate for thermal defocus that solves the above-mentioned problems of the prior art by employing means for compensating thermal expansion of the tunable lens.

SUMMARY OF THE INVENTION

Thus, the above-described object and several other objects are intended to be obtained in a first aspect of the invention by providing a tunable or controllable lens, comprising: a first and a second transparent membrane; a transparent, deformable, non-fluid body located, such as sandwiched, in between the first and the second transparent membrane; one or more actuators; and means for compensating thermal expansion of the tunable lens.

The tunable or controllable lens is a lens having a variable optical power.

The first and a second transparent membrane are cover members that can be transparent to VIS light, i.e. have a determined transmittance within the visible (VIS) light spectral range making the lens suitable for being used in a camera module.

The transparent deformable, non-fluid lens body is preferably made from an elastic material. Since the lens body is non-fluid, no fluid-tight enclosure is needed to encapsulate the lens body to prevent a leakage therefrom.

In some embodiments, the tunable lens may comprise a support wall. The support wall may be arranged to support the first transparent membrane and/or the second transparent membrane.

When the support wall is present, the lens comprises a gap, such as an air gap, between a potential support wall and the transparent, deformable, non-fluid body. The motion of the non-fluid body is therefore unrestrained radially relative to the optical axis, i.e. along directions perpendicular to the optical axis.

In some embodiments, the transparent, deformable, non-fluid body comprises a first polymer.

The first polymer may be a polymer network of cross-linked or partly cross-linked polymers comprising a miscible oil or combination of oils.

In some embodiments, the transparent, deformable, non-fluid body is made from a soft polymer, which may include a number of different materials, such as silicone, polymer gels, a polymer network of cross-linked or partly cross-linked polymers, and a miscible oil or combination of oils. The elastic modulus of the non-fluid lens body may be larger than 300 Pa, thereby avoiding deformation due to gravitational forces in normal operation. The refractive index of the non-fluid lens body may be larger than 1.3, such as above 1.35. The transparent, deformable, non-fluid body may have a refractive index which is equal, substantially equal or close to the refractive index of the first and the second transparent membrane in order to reduce reflections at the boundaries of the transparent, deformable, non-fluid body.

The one or more actuators are arranged to generate a controllable bending, tilt or displacement or a combination thereof. The controllable change of the overall outer shape of the lens is controlled dependent on an electrical or optical control signal, such as a control signal generated by a control system.

The one or more actuators may be configured to solely generate a controllable bending of the first or the second transparent membrane. Thus, by the actuation, the first and/or second transparent membrane can be bend into a concave or convex shape and thereby provide an optical power to light transmitted through the tunable lens.

When a support wall is present, the one or more actuators may be fixed to the support structure so that the displacement elements displaces relative to the support structure.

The one or more actuators may be piezoelectric actuators.

The one or more piezoelectric actuators are arranged so that the lens comprises an inner portion that constitutes the lens area, surrounded by the one or more piezoelectric actuators, so that light can pass unobstructed through the lens area. The transparent, deformable, non-fluid body is arranged so that it covers at least the lens area, but may also extend beyond the extension of the lens area towards the perimeter of the first or second transparent membrane.

In some embodiments, the one or more actuators are or comprise Voice Coil Motors (VCMs).

In some other embodiments, the one or more actuators are or comprise Shape Memory Alloys (SMA) actuators.

SMAs are actuators comprising materials that modify shape, stiffness and natural frequency, and other mechanical characteristics in response to temperature. SMA actuators may have the shape of wires, springs or ribbons.

The means for compensating thermal expansion of the tunable lens are any means suitable for compensating the thermal expansion of the tunable lens.

The solution of the invention aims at solving the problem of thermal expansion within a tunable lens, which is generated by having materials, structure elements, first and the second transparent membranes or transparent, deformable, non-fluid body having different CTE.

Compensation of thermal expansion may be achieved with thickness gradient within the transparent, deformable, non-fluid body.

In some embodiments, the means for compensating thermal expansion of the tunable lens comprises a second polymer located in between the first and the second transparent membranes.

An example of thermal expansion compensation employs the presence of at least two polymers, i.e. a first and a second polymer, within the transparent, deformable, non-fluid body.

The first and second polymer may have a different CTE, thereby producing a first polymer layer and a second polymer layer.

In some further embodiments, the first polymer layer and the second polymer layer have a thickness gradient along a radius of the tunable lens.

The different CTE and the radial thickness gradient may create a plano-convex shape within the transparent, deformable, non-fluid body compensating for possible thermal expansion.

A similar plano-convex structure may be implemented within one of the first and the second transparent membrane, resulting in in thickness gradient within the first polymer along the lens radius. The first polymer expansion will thus increase with distance from center axis.

Thus, in some embodiments, the second transparent membrane is a plano-convex membrane, thereby creating a thickness gradient along a radius of the tunable lens in the first polymer.

The second transparent membrane being a plano-convex membrane is thus a means for compensating thermal expansion within the tunable lens.

Compensation of thermal expansion may also be achieved with modifications of coating within the tunable lens structure.

In some other embodiments, the means for compensating thermal expansion comprise at least one coating located onto the first and/or the second transparent membrane.

At least one coating may be a coating layer, e.g. a film of material deposited the first and/or the second transparent membrane.

Covering layer, film, veneer or sheet may be used with the description to refer to the coating layer located onto the first and/or the second transparent membrane.

In some embodiments, the at least one coating is a film of an optical transparent material having a different CTE than the one of the first and the second transparent membrane.

The CTE of the first transparent membrane is different from the one of the second transparent membrane.

The at least one coating may be a stack of layers.

In some embodiments, the at least one coating may be not optically transparent.

In some other embodiments, the at least one coating may be applied outside the optical aperture of the tunable lens.

In some further embodiments, the at least one coating may be an antireflective coating.

By antireflective coating is understood a coating of the optical lens which reduces the average reflection of the optical lens with respect to the optical lens without the coating.

The at least one coating may be applied to more than one surfaces, such as the top and the bottom surface of the first and the second transparent membrane.

The thickness of the at least one coating may be tuned so as to achieve the desired thermal behavior.

In some further embodiments, the means for compensating thermal expansion of the tunable lens comprises at least one structure element located onto, such as glued to, the first and/or the second membrane.

The at least one structure element may be a ring structure of a selected material located, such as attached to, the first and/or the second transparent membrane by different means, such as glue, adhesive tape, laser welding or others.

In some embodiments, the at least one structure element is a pressing structure element.

The pressing structure element may be the ring structure.

The pressing structure element may be attached to opposite side to the first and/or the second transparent membrane. This configuration may be advantageous as reversing the thermal deformation impact onto the first and/or the second transparent membrane.

In some embodiments, the at least one structure element are one or more structure elements. The one or more structure elements may have different CTES and may have different CTE than the one of the first and/or the second transparent membrane.

In general, a specific combination of structure elements, membranes and polymer with different CTE may be found so as to minimize the thermal expansion of the tunable lens.

In some other embodiment, the at least one structure element is or comprises a supporting structure element.

In some further embodiments, the at least one structure element has a stop function, thereby limiting the deformation of the first and/or the second transparent membrane.

To allow thermal expansion at certain temperature range and limit thermal expansion at other temperatures, the at least one structure element may have a stop function, e.g. may be a "hard stop".

A "hard stop" is herein defined as a mechanical element coming in contact with at least part of the tunable lens under thermal deformation, thus limiting thermal induced expansion.

For example, the at least one structure element may be a structure having a gap, such as an air gap, separating the supporting structure element and the transparent, deformable, non-fluid body.

The presence of the gap allows some degree of lifting of the first or second transparent membrane by thermal expansion of the transparent, deformable, non-fluid body, thus restricting the degree of thermal expansion to a desired level.

In some other embodiments, the at least one structure element may be a limiting ring structure restraining the deformation of the first or second transparent membrane due to undesired thermal expansion of the transparent, deformable, non-fluid body to a desired distance.

In a second aspect, the invention relates to a camera module (CM) comprising a tunable lens according to the first aspect of the invention.

In a third aspect, the invention relates to a method for compensating thermal expansion of a tunable lens according to the first aspect of the invention, the method comprising: depositing transparent, deformable, non-fluid body onto the first or the second transparent membrane; providing a thickness gradient within said transparent, deformable, non-fluid body along a radius of the tunable lens.

In a fourth aspect, the invention relates to a method for compensating thermal expansion of a tunable lens, the tunable lens comprising a first and a second transparent membrane, a transparent, deformable, non-fluid body located in between the first and the second transparent membrane and one or more actuators; the method comprising: depositing transparent, deformable, non-fluid body onto the first or the second transparent membrane; providing a thickness gradient within the transparent, deformable, non-fluid body along a radius of said tunable lens.

The first and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The tunable lens of the invention will now be described in more details with regard to the accompanying figures. The figures show one way of implementing the present invention and are not to be construed as being limiting to other possible embodiments falling within the scope of the attached claim set.

DETAILED DESCRIPTION OF AN EMBODIMENT

Figure 1:
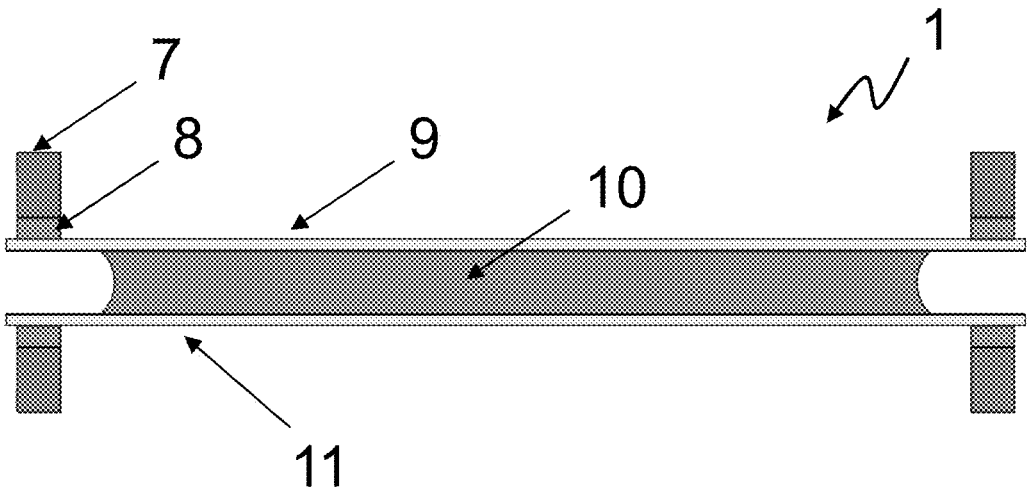
FIGS. 1-8 are cross sections or schematic illustrations of a tunable lens according to some embodiments of the invention.

FIG. 1 is a cross section of a tunable lens 1 having a transparent, deformable, polymer body 10 sandwiched in between two transparent membranes 9 and 11. A pressing structure 7 is present on both external surfaces of the two transparent membranes 9 and 11. The pressing structure 7 is glued through glue 8 to the external surface of the two transparent membranes 9 and 11.

Figure 2:
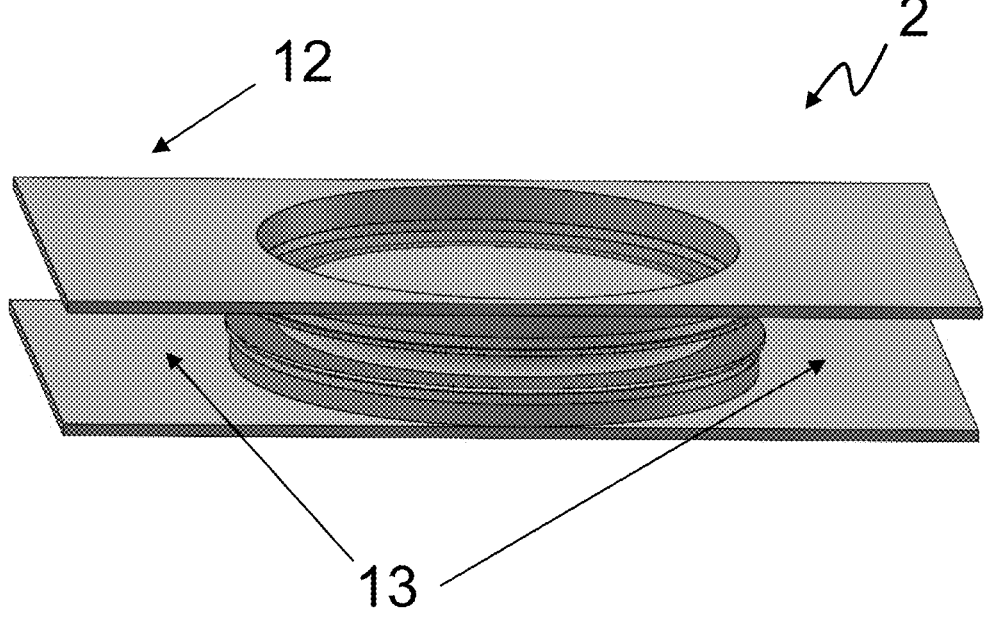

FIG. 2 is a schematic illustration of a tunable lens 2 having a transparent, deformable, polymer body sandwiched in between two transparent membranes. The pressing structure 12 is show extending the optical aperture of the tunable lens so as to leave areas 13 for placing actuators means at both side of the tunable lens. The pressing structure 12 is glued to the external surface of the two transparent membranes.

Figure 3:
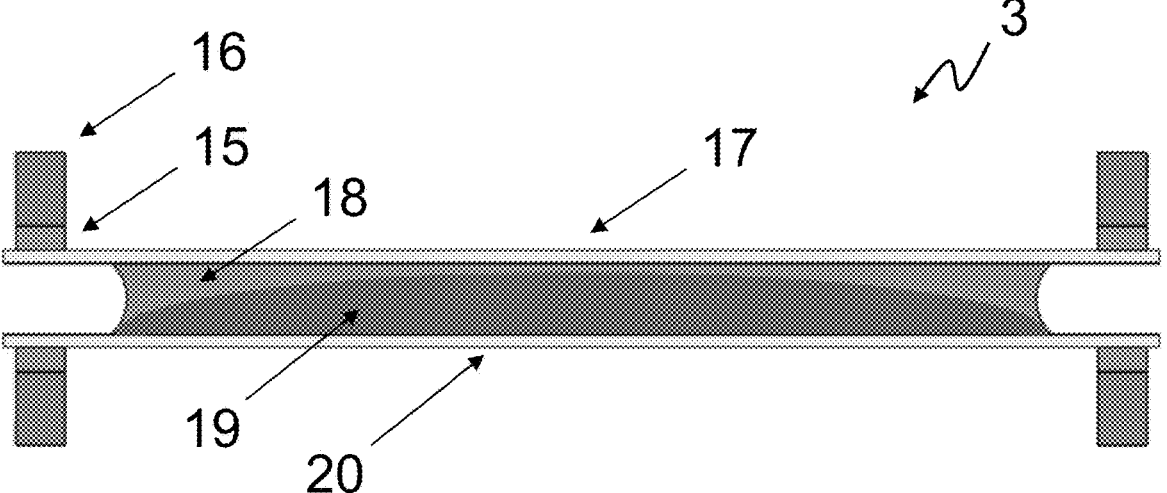

FIG. 3 is a cross section of a tunable lens 3 comprising two transparent membranes 17 and 20 and a pressing structure 16 glued through glue 15 to the external surfaces of the two transparent membranes 17 and 20.

Tunable lens 3 has a transparent, deformable, body comprising a first polymer 18 and a second polymer 19 located in between the first and the second transparent membranes 17 and 20.

The first polymer 18 has a different CTE than the second polymer 19.

The second polymer 19 has a thickness gradient along a radius of the tunable lens 3 creating a plano-convex shape within the transparent, deformable, non-fluid body and between the first polymer 18 and second polymer 19.

Figure 4:
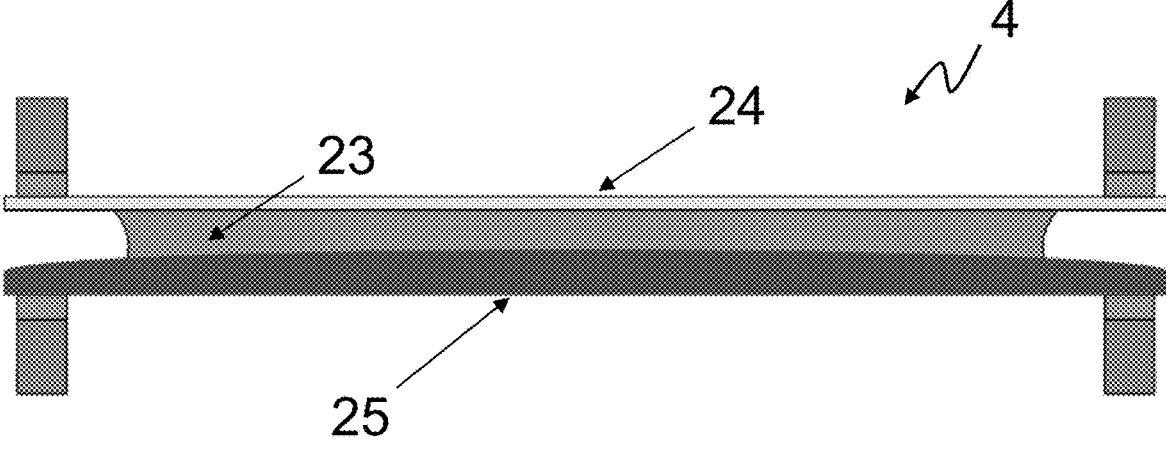

FIG. 4 is a cross section of a tunable lens 4 comprising a first transparent membranes 24 and a second transparent membrane 25 having a plano-convex structure.

The transparent, deformable, non-fluid polymer body 23, sandwiched between the first transparent membranes 24 and a second transparent membrane 25, shows thickness gradient along a radius induced by the plano-convex structure of the second transparent membrane 25.

Figure 5:
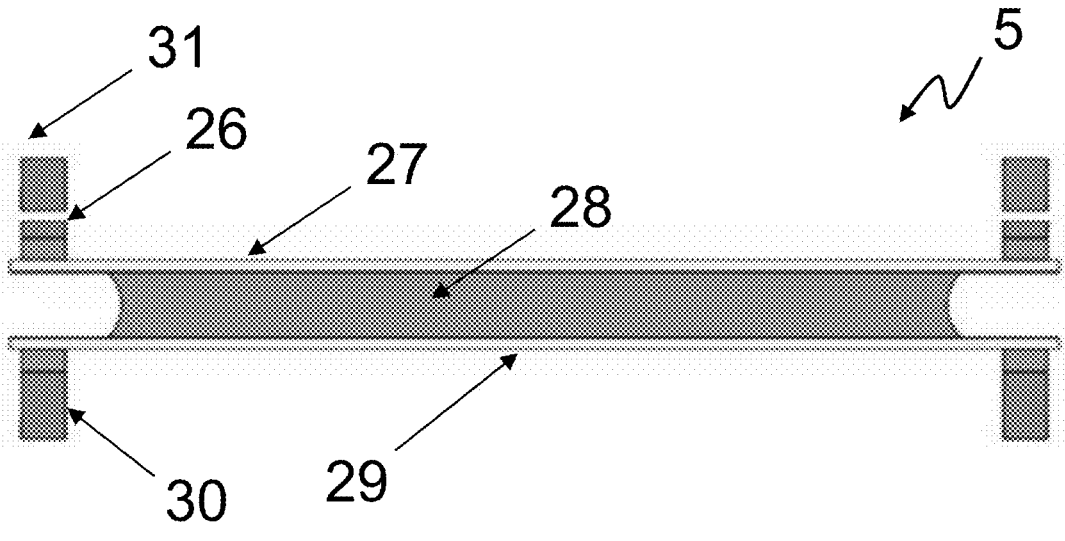

FIG. 5 is a cross section of a tunable lens 5 having a transparent, deformable, polymer body 28 sandwiched in between two transparent membranes 27 and 29.

The tunable lens 5 has a bottom structure 30 glued to the bottom transparent membrane 29 and a top structure 31 with a hard stop function.

The top structure 31 has an air gap 26 having a stop function.

The presence of the air gap 26 allows some degree of lifting of the first transparent membrane 27 due to thermal expansion of the transparent, deformable, non-fluid body 28, thus restricting the degree of thermal expansion to a desired level.

Figure 6:
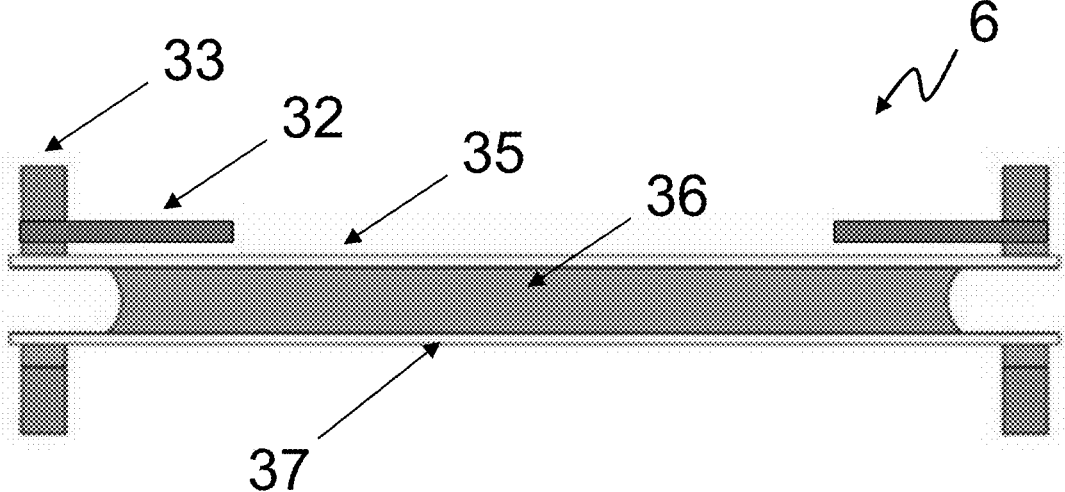

FIG. 6 is a cross section of a tunable lens 6 having a transparent, deformable, polymer body 36 sandwiched in between two transparent membranes 35 and 37.

The top structure 33 has a limiting ring structure 32 extending over the optical aperture of the tunable lens 6 having a stop function.

The limiting ring structure 32 restrains the deformation of the first transparent membrane 35 due to undesired thermal expansion of the transparent deformable, non-fluid body 36.

Figure 7:
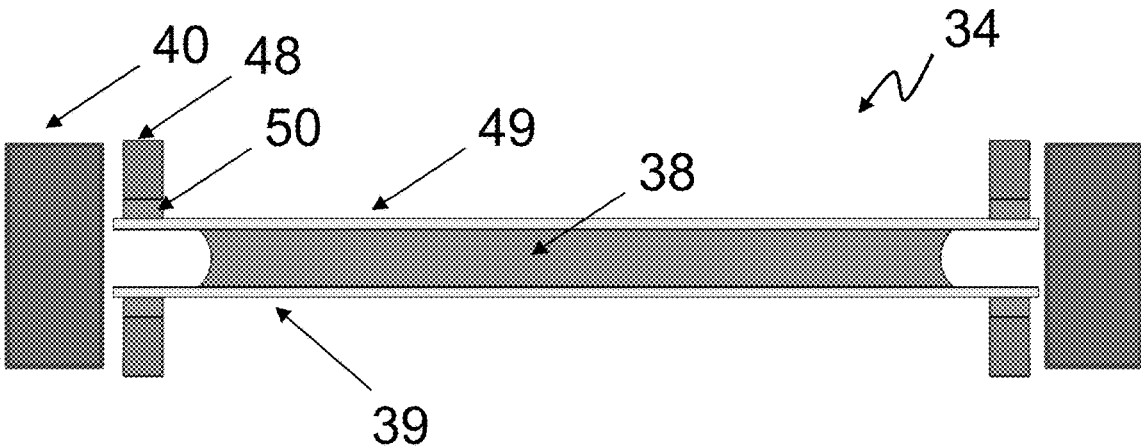

FIG. 7 is a cross section of a tunable lens 34 having a transparent, deformable, polymer body 38 sandwiched in between two transparent membranes 39 and 49.

A pressing structure 48 is present on both external surfaces of the two transparent membranes 39 and 49. The pressing structure 48 is glued through glue 50 to the external surface of the two transparent membranes 39 and 49.

The tunable lens 34 comprises a wall structure 40 which may or may not be arranged to support the first and/or second transparent membrane.

The wall structure 40 may be arranged so that it at least partially surrounds the non-fluid body 38.

Figure 8:
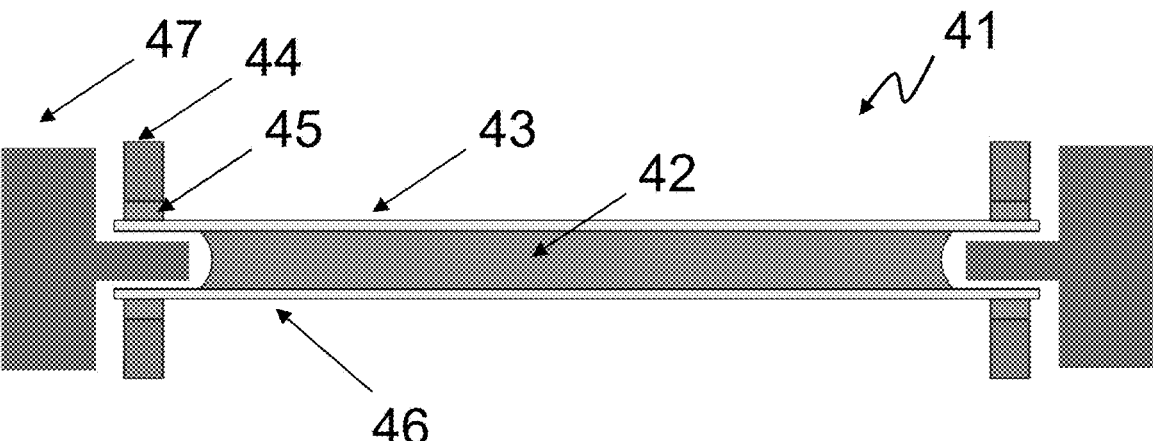

FIG. 8 is a cross section of a tunable lens 41 having a transparent, deformable, polymer body 42 sandwiched in between two transparent membranes 43 and 46.

A pressing structure 44 is present on both external surfaces of the two transparent membranes 43 and 46. The pressing structure 44 is glued through glue 45 to the external surface of the two transparent membranes 43 and 46.

The tunable lens 41 comprises a wall structure 47 which may or may not be arranged to support the first and/or second transparent membrane.

The wall structure 47 may be arranged so that it at least partially surrounds the non-fluid body 42.

Figures 9, 10, 11:
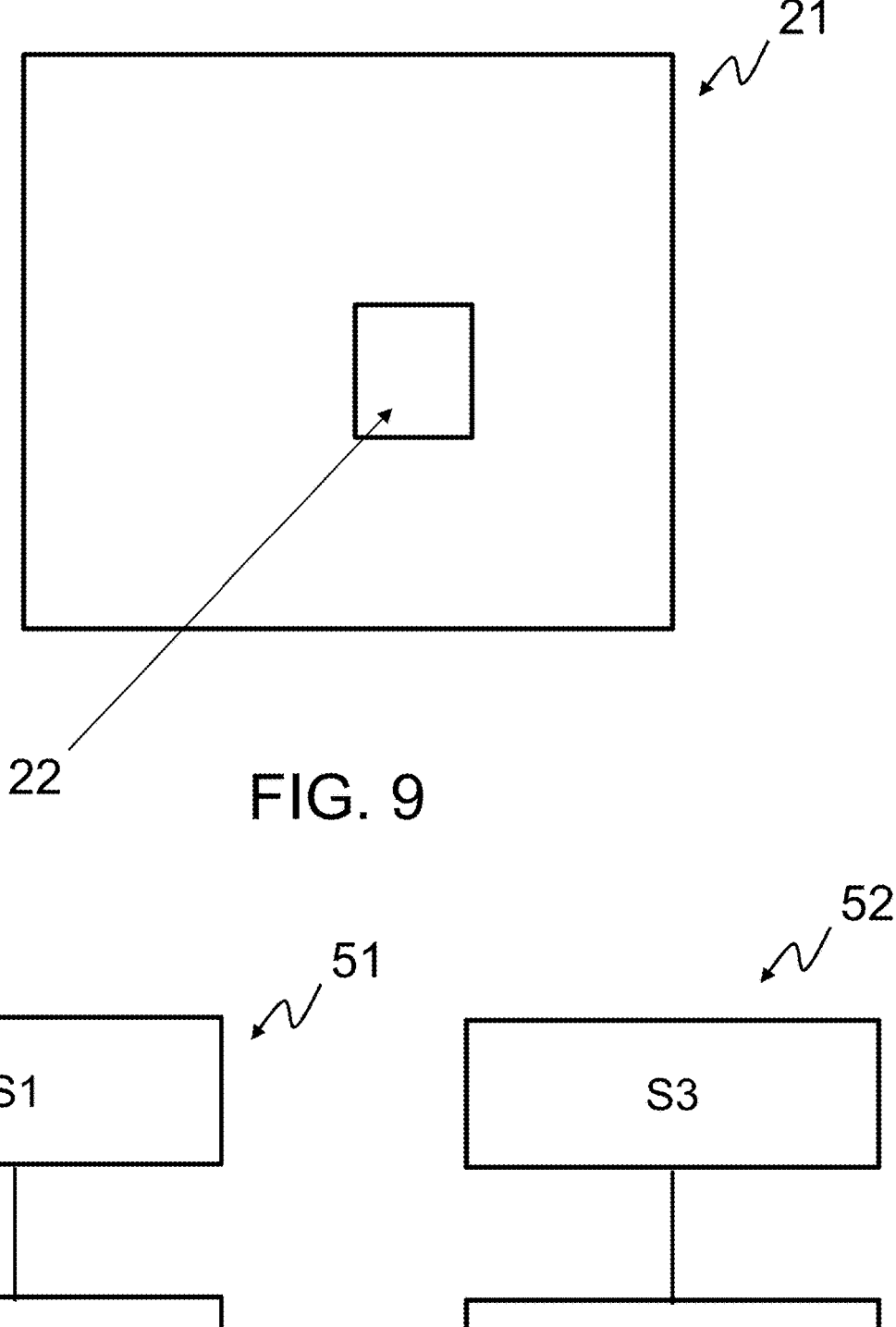
FIG. 9 is a schematic illustration of a CM comprising a tunable lens according to some embodiments of the invention.
FIG. 10 is a flow chart of a method according to some embodiments of the invention.
FIG. 11 is a flow chart of a method according to some other embodiments of the invention.

FIG. 9 is a schematic illustration of a CM 21 comprising a tunable lens 22 according to some embodiments of the invention.

FIG. 10 is a flow chart of a method according to some embodiments of the third aspect of the invention.

The method 51 for compensating thermal expansion of a tunable lens according to the first aspect of the invention comprises:

S1, depositing transparent, deformable, non-fluid body onto the first or the second transparent membrane;

S2, providing a thickness gradient within the transparent, deformable, non-fluid body along a radius of said tunable lens.

FIG. 11 is a flow chart of a method 52 according to some other embodiments of the invention.

The method 52 for compensating thermal expansion of a tunable lens, the tunable lens comprising a first and a second transparent membrane, a transparent, deformable, non-fluid body located in between the first and the second transparent membrane and one or more actuators; the method comprising:

S1, depositing transparent, deformable, non-fluid body onto the first or the second transparent membrane;

S2 providing a thickness gradient within the transparent, deformable, non-fluid body along a radius of said tunable lens.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A tunable lens, comprising:

a first and a second transparent membrane;

a transparent, deformable, non-fluid body located in between said first and said second transparent membrane, wherein said transparent, deformable, non-fluid body comprises a first polymer;

one or more actuators; and a second polymer located in between said first and said second transparent membranes, wherein said first and second polymers have a different Coefficient of Thermal expansion (CTE), thereby producing a first polymer layer and a second polymer layer, wherein said first polymer layer and said second polymer layer have a thickness gradient along a radius of said tunable lens.

2. The tunable lens according to claim 1, wherein said first polymer is a polymer network of cross-linked or partly cross-linked polymers comprising a miscible oil or combination of oils.

3. The tunable lens according to claim 1, wherein said second transparent membrane is a plano-convex membrane, thereby creating a thickness gradient along a radius of said tunable lens in said first polymer.

4. The tunable lens according to claim 1, wherein the second polymer is comprised in at least one coating located onto said first and/or said second transparent membrane.

5. The tunable lens according to claim 4, wherein said at least one coating is a film of an optical transparent material having a different CTE than the one of said first and said second transparent membranes.

6. The tunable lens according to claim 1, wherein at least one structure element located onto said first and/or said second membrane comprises the second polymer.

7. The tunable lens according to claim 6, wherein said at least one structure element is a pressing structure element.

8. The tunable lens according to claim 6, wherein said at least one structure element is a supporting structure element.

9. The tunable lens according to claim 6, wherein said at least one structure element has a stop function, thereby limiting the deformation of said first and/or said second transparent membrane.

10. The tunable lens according to claim 1, wherein said one or more actuators are piezoelectric actuators.

11. The tunable lens according to claim 1, wherein said one or more actuators are Voice Coil Motors (VCMs).

12. The tunable lens according to claim 1, wherein said one or more actuators are Shape Memory Alloy (SMA).

13. A camera module (CM) comprising the tunable lens according to claim 1.

* * * * *